(12) United States Patent
Kwong et al.

(10) Patent No.: US 10,608,961 B2
(45) Date of Patent: Mar. 31, 2020

(54) TECHNIQUES FOR HANDLING MESSAGE QUEUES

(71) Applicant: salesforce.com, inc., San Francisco, CA (US)

(72) Inventors: Helen Kwong, Palo Alto, CA (US); Benjamin Busjaeger, San Carlos, CA (US)

(73) Assignee: salesforce.com, inc., San Francisco, CA (US)

( * ) Notice: Subject to any disclaimer, the term of this patent is extended or adjusted under 35 U.S.C. 154(b) by 135 days.

(21) Appl. No.: 15/974,283

(22) Filed: May 8, 2018

(65) Prior Publication Data

US 2019/0349319 A1 Nov. 14, 2019

(51) Int. Cl.
*H04L 12/861* (2013.01)
*H04L 29/08* (2006.01)

(52) U.S. Cl.
CPC .............. *H04L 49/90* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 5,974,414 A | 10/1999 | Stanczak et al. | |
| 6,658,485 B1 | 12/2003 | Baber et al. | |
| 7,844,759 B1 | 11/2010 | Cowin | |
| 9,639,460 B1 * | 5/2017 | Karppanen | G06F 12/023 |
| 2003/0182464 A1 | 9/2003 | Hamilton et al. | |
| 2004/0158831 A1 * | 8/2004 | Amano | G06F 9/4812 718/100 |
| 2007/0253451 A1 * | 11/2007 | Koob | H04L 1/1883 370/508 |
| 2010/0191911 A1 * | 7/2010 | Heddes | G06F 15/16 711/118 |
| 2010/0211954 A1 * | 8/2010 | Bauer | G06F 9/4881 718/103 |
| 2010/0293353 A1 * | 11/2010 | Sonnier | G06F 15/167 711/170 |
| 2011/0078696 A1 * | 3/2011 | Blackburn | G06F 9/4881 718/104 |
| 2011/0258245 A1 * | 10/2011 | Blocksome | G06F 15/17318 709/201 |
| 2012/0198004 A1 | 8/2012 | Watte | |

(Continued)

*Primary Examiner* — Otis L Thompson, Jr.
(74) *Attorney, Agent, or Firm* — Kowert, Hood, Munyon, Rankin & Goetzel, P.C.

(57) ABSTRACT

Techniques are disclosed relating to handling queues. A server-based platform, in some embodiments, accesses queue information that includes performance attributes for a plurality of queues storing one or more messages corresponding to one or more applications. In some embodiments, the platform assigns, based on the performance attributes, a corresponding set of the plurality of queues to each of a plurality of processing nodes of the platform. In some embodiments, the assigning of a corresponding set of queues to a given one of the plurality of processing nodes causes instantiation of: a first set of one or more dequeuing threads and a second set of one or more processing threads. The dequeuing threads may be executable to dequeue one or more messages stored in the corresponding set of queues. The processing threads may be executable to perform one or more tasks specified in the dequeued one or more messages.

20 Claims, 11 Drawing Sheets

(56) References Cited

U.S. PATENT DOCUMENTS

| | | | |
|---|---|---|---|
| 2012/0275464 A1* | 11/2012 | Voruganti | H04L 49/90 370/412 |
| 2014/0105218 A1* | 4/2014 | Anand | H04L 47/6255 370/412 |
| 2014/0189695 A1* | 7/2014 | Xu | G06F 9/46 718/102 |
| 2015/0186104 A1* | 7/2015 | Moore | G06F 3/162 700/94 |
| 2017/0317944 A1* | 11/2017 | John | H04L 47/56 |
| 2018/0167340 A1* | 6/2018 | Oren | H04L 47/62 |
| 2019/0227842 A1* | 7/2019 | Qiu | G06F 9/4881 |

* cited by examiner

TECHNIQUES FOR HANDLING MESSAGE QUEUES

BACKGROUND

Technical Field

This disclosure relates generally to computer systems and, more specifically, to the handling of messages and message queues.

Description of the Related Art

Large-scale computer systems (e.g., cloud-based platforms) often run applications developed by different users of those systems. In various cases, applications (and even the individual components) are decoupled from one another to allow for improved scalability and reliability. These applications, however, often cannot perform particular tasks by themselves and thus are designed to interact with other applications that are capable of performing the tasks. Some large-scale computer systems may use a message queue service that serves as a middle man for receiving messages (specifying tasks) from one application and delivering those messages to another application for processing.

Figure 1A:
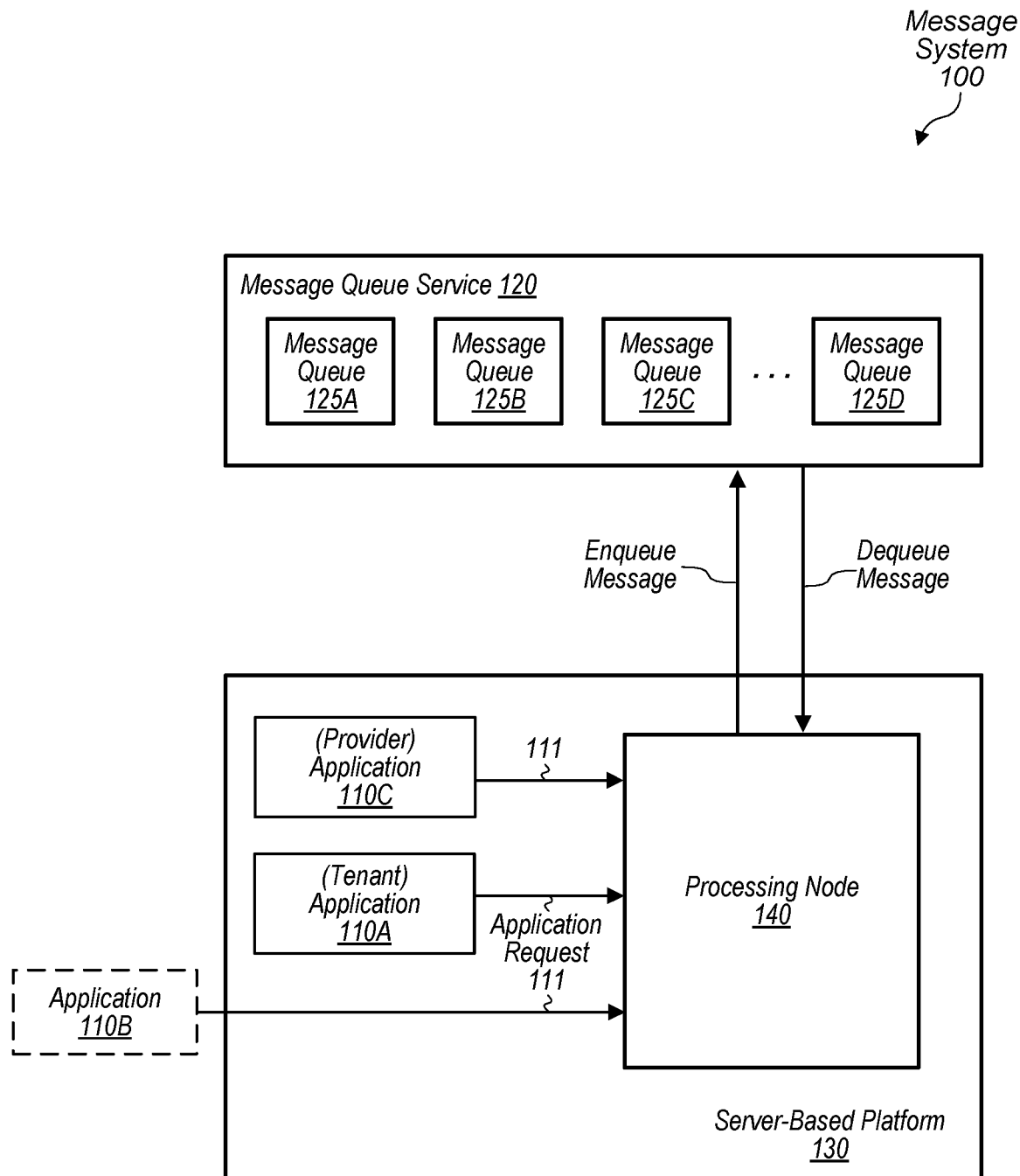
FIGS. 1A-1B are block diagrams illustrating example elements of a message system that facilitates the handling and processing of messages, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "node configured to execute an instance of a database management application" is intended to cover, for example, a computer system that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a database system having eight nodes, the terms "first" and "second" nodes can be used to refer to any two of the eight nodes.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

As noted, message queues are commonly used as an intermediary between applications such as those running in a cloud-based platform. The manner in which message queue services are used, however, is often prone to various issues such as those involving starvation. For example, if a user A enqueues a large amount of messages that take a long time to process (e.g., one hour) and a user B enqueues messages in the same queue behind those of user A, then until all of user A's messages are processed, user B will not have any messages processed. That is, all allocated processing threads are busy processing messages for user A and will be for the next hour. As a result, user B will become stuck as the relevant system is unable to provide the resources necessary to process user B's messages within a reasonable timeframe. Additionally, the message queue service may be provided by an external party that charges for use of the service and thus it may be desirable to implement measures to reduce the cost.

Accordingly, the present disclosure describes various techniques for handling message queues, including the provisioning of message queues and the processing of messages stored within those queues, that may lead to improved performance and/or reduced cost. In various embodiments described below, a server-based platform provisions a set of message queues using a message queue service and assigns each of those queues to one or more processing nodes of the server-based platform for processing messages that are enqueued in those queues by computer-based applications. In some embodiments, the server-based platform provisions a set of message queues using the message queue service that can be used to store messages having certain properties (e.g., the message type). In various embodiments, the server-based platform accesses information describing the set of message queues, including performance attributes (e.g., latency) of those queues. In some embodiments, the server-based platform assigns, to each of the processing nodes based on the performance attributes, a subset of the set of message queues that the processing node is responsible for processing messages from. In various embodiments, assigning the subset of message queues causes the associated processing node to instantiate a set of dequeuing threads for retrieving messages from the assigned subset and a set of processing threads for processing those retrieved messages. In various embodiments, these assigned subsets may be modified by the server-based platform to add or remove queues. In some embodiments, when a message queue is not being used (e.g., has not received a message for some time), the server-based platform performs a queue removal process to remove that message queue from the set of queues. Accordingly, the server-based platform may instruct the processing node that is responsible for that queue to no longer attempt to retrieve messages from that queue.

These techniques may be advantageous over prior approaches as these techniques reduce starvation issues associated with prior approaches, allow multiple processing nodes (and even processing threads) to concurrently process messages, and are cost-effective. In particular, the server-based platform may, in various instances, provision queues that store messages of a particular type and from a particular user. Returning to the example above, under these techniques, a queue for user A and a queue for user B may be provisioned that each have a set of threads processing from them. Thus, user B's messages can be processed within a reasonable timeframe. Moreover, the server-based platform may remove queues allocated at the message queue service using these techniques and thus reduce the cost of maintaining queues at the service. A system for implementing these techniques will now be described in greater detail below, starting with FIG. 1.

Turning now to FIG. 1A, a block diagram of a message system 100 is shown. As illustrated, server-based platform 130 includes a processing node 140, which provides an interface for applications 110 to communicate with a message queue service 120. These applications include applications of a tenant of platform 130 (e.g., application 110A), applications of platform 130 itself (e.g., application 110C), or applications external to platform 130. While not shown, in various embodiments, applications 110 may be executed by processing node 140. In some embodiments, message system 100 may be implemented differently than shown— e.g., message queue service 120 may be a part of server-based platform 130.

Message system 100, in various embodiments, is a collection of components (e.g., applications 110, service 120, and platform 130) that implement a messaging process that allows components within message system 100 to communicate with one another. These components may be implemented in hardware, software, or a combination thereof (e.g., a set of hardware components that execute applications 110). In various embodiments, these components reside in different domains that are handled by different entities. For example, company A may manage and provide message queue service 120 to company B for storing and retrieving messages associated with applications such as applications 110.

Applications 110, in various embodiments, are each a set of software routines that are executable to perform various functions and tasks. Applications 110 may include, for example, database management systems (DBMS), web browsers, development tools, word processors, etc. In some embodiments, applications 110 may be designed by providers of platform 130 to implement the underlying functionality of platform 130 or designed by the tenants of platform 130 to take advantage of that functionality. For example, platform 130 may be a platform as a service (PaaS) (implemented via components of platform 130 such as application 110C) that allows developers to create applications 110 that communicate with the service. Accordingly, in some embodiments, applications 110 may issue requests 111 to node 140 for performing particular tasks. For example, platform 130 may include a database that stores data for a certain user of platform 130. Thus, when that user wishes to move data from that database into another one, an application 110 (that acts on behalf of that user) may provide a request 111 to node 140 that instructs it to move the data.

Accordingly, applications 110 may trigger an enqueuing of a message by issuing request 111 to a node 140 (or another component within platform 130) to perform work. That node 140 may enqueue a message (e.g., in one of queues 125) that indicates the work specified in that request 111. In some embodiments, requests 111 may be issued by internal components (developed by the provider) of platform 130 such as provider application 110C or processing node 140 in order to perform particular work such as a scheduled maintenance job. Thus, nodes 140 may, for example, enqueue a message not as a response to a request 111 from a tenant application 110, but instead, as a response to a request 111 from a provider application 110 to perform particular work. As such, in various embodiments, requests 111 cause messages to be enqueued within queues 125 of service 120 and then to be subsequently dequeued by processing node 140 for processing. In some embodiments, applications 110 may enqueue messages directly within queues 125 without having node 140 enqueue the messages for them.

Message queue service 120, in various embodiments, is a set of software routines that are executable to implement message queues 125 that enable communication between components of message system 100. In some embodiments, message queues 125 allow an asynchronous communications protocol to be implemented in which a sender (e.g., an application 110 via node 140) can issue a message that a receiver of the message (e.g., processing logic implemented by node 140) who does not process for some time. Thus, in some embodiments, messages that are enqueued in a queue 125 are stored there until the receiver retrieves them. In various embodiments, service 120 includes multiple queues 125 that, in some cases, respectively store different types of messages. As an example, platform 130 may support multiple types of operations (e.g., bulk insertion of data, bulk deletion of data, etc.) and thus a given queue 125 may be provisioned that stores messages representing only a particular type of operation. The particulars of the different variations of queues 125 that may be provisioned are discussed in greater detail below with respect to FIG. 2.

Server-based platform 130, in various embodiments, is a set of software routines, hardware, or a combination thereof that implements a platform service that allows users of that service to develop, run, and manage applications 110. For example, platform 130 may be a multi-tenant database system such as the multi-tenant database system discussed in greater detail below with respect to FIGS. 8 and 9. In various embodiments, platform 130 interacts with users, their applications 110, and databases in order to store, analyze, operate on, and serve data. Accordingly, platform 130 may allow applications 110 to interact with other components of platform 130 via messages enqueued in queues 125.

Processing node 140, in various embodiments, is hardware or a combination of hardware and software routines that facilitates the processing of messages associated with applications 110. A processing node 140 may be, for example, a virtual machine running software routines on underlying hardware. In various embodiments, processing node 140 implements a portion of server-based platform 130's functionality by executing provider applications 110. (Thus, while not shown, in various embodiments, applications 110 may be executing on processing node 140).

In various embodiments, processing node 140 includes routing logic for enqueuing messages received from applications 110. In particular, when an application 110 needs for processing node 140 to perform particular work, that application 110 may issue a request 111 to node 140. Processing node 140 may then execute the routing logic to determine the appropriate queue 125 for storing a message specifying that work. Once the message has been enqueued, processing node 140 may, at a later time, dequeue the message and perform the work specified therein. This routing logic is described in greater detail with respect to FIG. 2. An example diagram of a message being dequeued will now be discussed.

Figure 1B:
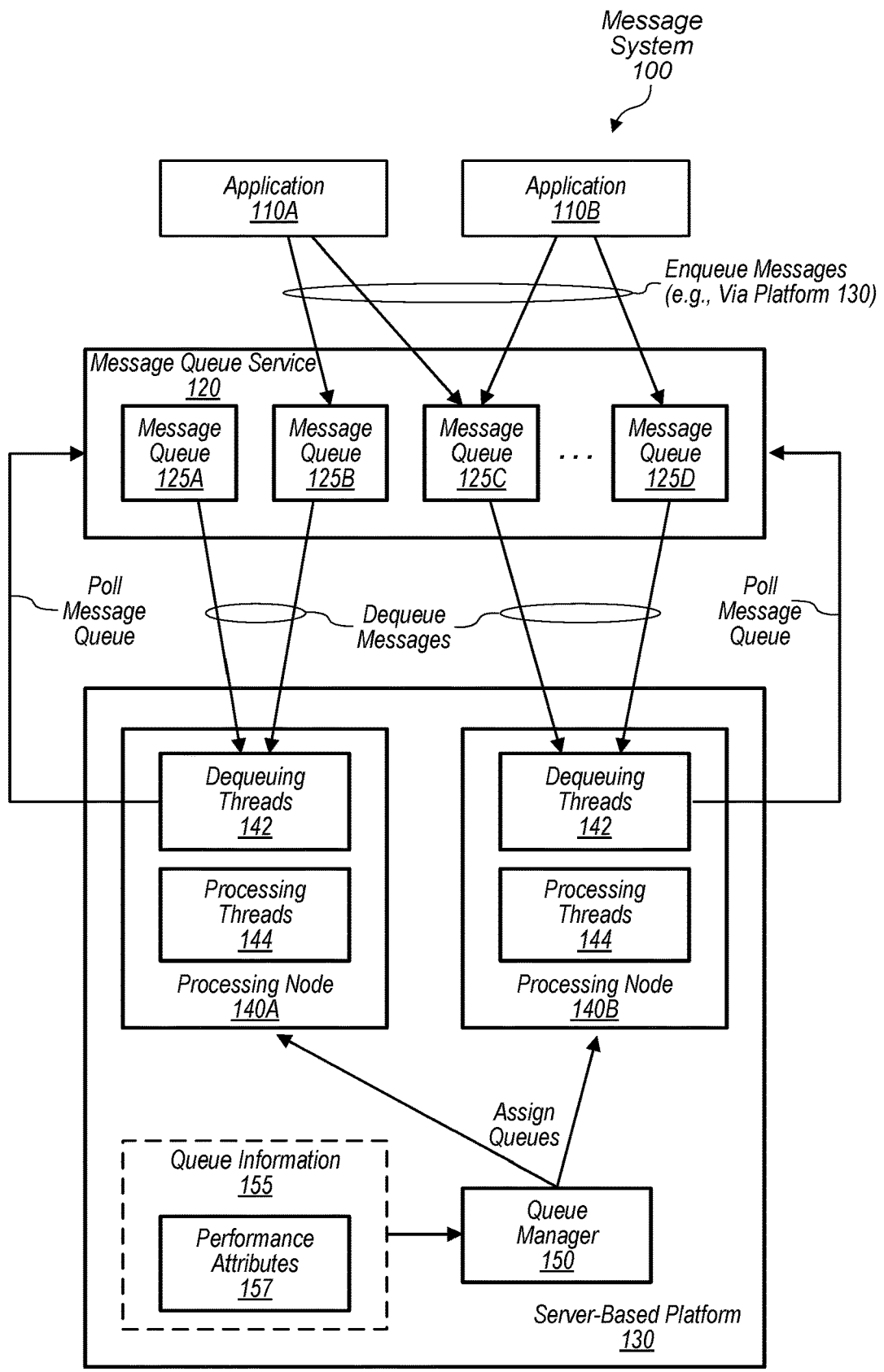

Turning now to FIG. 1B, a block diagram of a message system 100 is shown. In the illustrated embodiment, message system 100 includes applications 110, a message queue service 120, and a server-based platform 130. As further shown, server-based platform 130 includes processing nodes 140 and a queue manager 150. While queue information 155 is depicted as residing within server-based platform 130, in some embodiments, information 155 may reside entirely or in portions at a location that is external to server-based platform 130 such as message queue service 120. Applications 110 are shown as directly enqueuing messages in queues 125 to present an example flow of a messaging process; however, as discussed earlier, applications 110 may issue requests to processing nodes 140 that enqueue messages based on those requests. In some embodiments, message system 100 may be implemented differently than shown—e.g., message queue service 120 may be a part of server-based platform 130.

As mentioned above, processing node 140, in various embodiments, facilitates the processing of messages issued from applications 110. To process messages, in various embodiments, a processing node 140 spawns dequeuing threads 142 and processing threads 144. A dequeuing thread 142, in various embodiments, is executable to dequeue messages from a set of message queues 125. In some embodiments, a dequeuing thread 142 is further executable to store dequeued messages in a buffer that is accessible to processing threads 144. In various embodiments, a processing thread 144 is executable to process messages fetched by dequeuing threads 142. In some embodiments, a processing node 140 spawns threads that perform both the dequeuing and processing of messages (i.e., fulfill the roles of dequeuing threads 142 and processing threads 144). When processing a given message, a processing thread 144 may invoke a particular handler that performs a set of functions to process that given message. That is, platform 130 may support various operations (e.g., dashboard refreshes, scheduled reports, bulk deletions, etc.) and thus there may be different message types (i.e., a message for each type of operation). Accordingly, when processing a given message, a processing thread 144 may invoke a handler that is appropriate for the type of that message. In some embodiments, the number of threads 142 and 144 to spawn and the particular queues 125 to be handled by a processing node 140 are determined by queue manager 150.

Queue manager 150, in various embodiments, manages the provisioning of message queues 125 and the assignment of those queues 125 to processing nodes 140. Manager 150 may provision queues 125 for different purposes based on different reasons. For example, a provider of platform 130 may wish to provide each tenant with their own queue 125 and thus may instruct manager 150 to provision (via message queue service 120) queues 125 to be used for storing messages of a particular tenant. After provisioning queues 125, manager 150 may assign those queues to one or more processing nodes 140. Accordingly, in various embodiments, manager 150 accesses queue information 155 to determine the current state of service 120. Queue information 155 may indicate, for example, what queues 125 have already been provisioned and attributes 157 that describe those queues such as the number of messages in each queue and the latency in processing a message from each queue. Based on information 155, manager 150 may assign a subset of the total number of provisioned queues 125 to a particular processing node 140 that is responsible for processing messages enqueued in those queues. In some embodiments, manager 150 provides information to that particular processing node 140 about the assignment including an instruction to instantiate a particular number of processing threads 144. The particulars of assigning queues 125 to processing nodes 140 are discussed in greater detail below with respect to FIG. 3.

In one example implementation of message system 100, server-based platform 130 provides services to multiple tenants. In order to avoid starvation issues where one tenant degrades the performance experienced by another, server-based platform 130 provisions at least one queue 125 for each tenant. In such an implementation, after provisioning queues 125, manager 150 accesses queue information 155 to determine what queues 125 have been provisioned along with performance attributes 157 of those queues (e.g., the time needed to process a message, the expected number of messages, etc.). Based on queue information 155, manager 150 assigns a subset of all provisioned queues 125 to each processing node 140. In this implementation, the assignment may be such that the workload in processing messages is roughly distributed among processing nodes 140. For example, if there are three queues 125 where one of them receives thousands of messages and the other two receive hundreds of messages, then one processing node 140 may be assigned to the first queue while another processing node 140 is assigned to the other two queues. After assigning queues 125 to nodes 140, manager 150 may provide information about the assignment to each processing node 140 that causes that node to instantiate a set of dequeuing threads 142 that retrieve messages from the assigned queues and a set of processing threads 144 that process those messages.

Implementing message system 100 in this manner may be advantageous as it may allow for queues to be provisioned in a way that avoids starvation issues. For example, each tenant may be provisioned at least one queue so that one tenant cannot submit a large volume of messages to a shared queue that cause another tenant's messages to not be processed in a reasonable timeframe. Also, message system 100 may allow for processing nodes 140 to be assigned in a manner that prevents an unequal distribution of messages—e.g., one processing node 140 is stuck processing millions of messages while another node 140 processes thousands of messages. The different ways to provision messages queues 125 will now be discussed with respect to FIG. 2.

Figure 2:
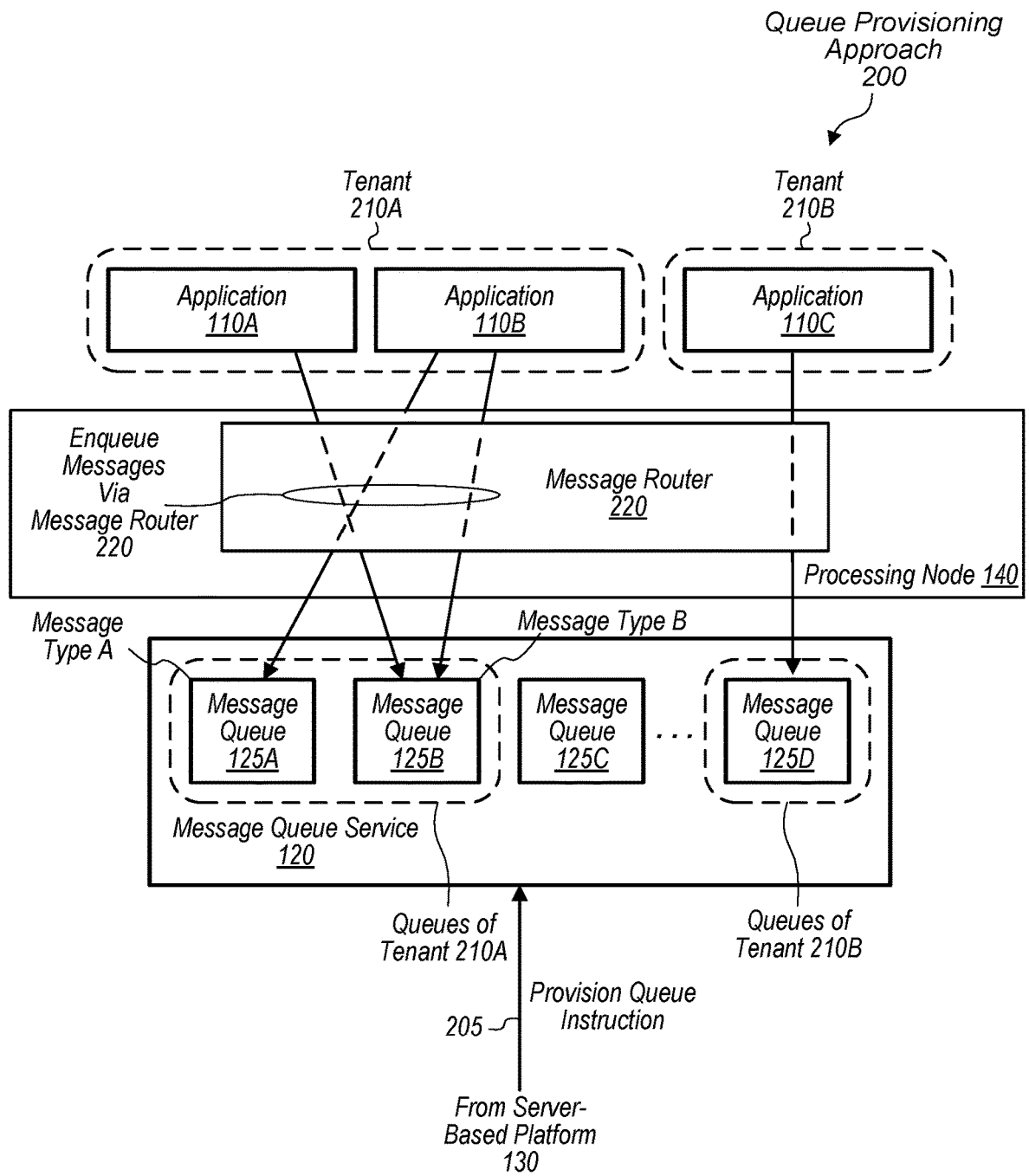
FIG. 2 is a block diagram illustrating example elements of an approach for provisioning message queues, according to some embodiments.

Turning now to FIG. 2, a block diagram of a queue provisioning approach 200 for provisioning queues 125 is shown. In the illustrated embodiment, approach 200 includes applications 110, processing node 140, and message queue service 120. As further shown, applications 110A and 110B are associated with a tenant 210A whereas application 110C is associated with a tenant 210B. Also as show, processing node 140 includes a message router 220. In various embodiments, approach 200 may be implemented differently than depicted—e.g., message router 220 may be included in a different component of platform 130.

As mentioned above, message queues 125, in various embodiments, store messages indicative operations to be performed as requested by applications 110. In some embodiments, messages are associated with a type that is indicative of the work to be performed in processing the messages. As an example, there may be a message type for tasks involving UI refreshes and another message type for tasks involving generating reports. The message type, in various cases, defines the amount time needed to process the associated message. Returning to the above example, messages for refreshing a UI may be processed in a second whereas messages for generating reports may take an hour to process. Thus, it may be desirable to provision queues 125 in a certain manner that accounts for the difference in processing times. Queues 125 may also be provisioned based on other criteria.

Accordingly, queues 125 may be provisioned in various different manners, including: one queue for all messages; one queue per message type; one queue per tenant; one queue per category of message type (e.g., statically long-running message types versus short-running message types); one queue per database instance (e.g., a queue for all tenants corresponding to an instance of platform 130); or one queue per a combination of the above. For example, queues 125 may be provisioned such that each tenant of platform 130 is assigned a queue for each message type that is supported by platform 130—i.e., one queue 125 per tenant and message type combination. In some embodiments, queues 125 may be provisioned in a dynamic manner that accounts for variables such as the recent traffic flow of a particular message type. For example, each tenant may be allocated a generic queue 125 that stores messages of all types. But in response to a spike in messages of a particular type that come from a particular tenant, platform 130 may provision a queue 125 that stores messages of the particular type that come from that particular tenant. Accordingly, that particular tenant may be associated with two different queues 125. But as the volume of messages of that particular type dwindle (i.e. there is less traffic flow), platform 130 may remove that queue 125.

When provisioning queues 125, in some embodiments, platform 130 names queues 125 based on their purpose. For example, a queue 125 that stores messages of a particular type for a particular tenant may be associated with a name indicative of that particular type and that particular tenant—reg_tenantID_messageType. This information may be used by message router 220 (e.g., a set of software routines executing on processing node 140) to determine where to enqueue messages originating from an application 110. In particular, router 220 may maintain a set of addresses (e.g., URLs) for accessing queues 125 and a mapping that indicates which queue address is relevant for the message this is being enqueued. Accordingly, in various embodiments, each processing node 140 maintains a mapping from a queue name to a uniform resource locator (URL) where a message may be sent. In some embodiments, platform 130 maintains a table with columns such as "QueueAddress", "QueueType", "MessageType" etc. that can be used by message router 220 to lookup the purpose of a queue 125 or its address. When sending a message, router 220 may first determine the appropriate name of its corresponding queue 125 based on its type and associated tenant. Thereafter, router 220 may determine the URL that is usable to access that queue 125. In some cases, however, the appropriate URL may not be found in the map and thus router 220 may contact service 120 to determine if the appropriate queue exists and what its URL is. In some embodiments, if no queue 125 exists with a particular name, then platform may provision that queue 125 at service 120 by issuing provision queue instruction 205 and then may update the mapping.

In some embodiments, a queue's name is also indicative of whether that queue 125 is a regular queue or a "dead-letter queue". As used herein, a dead-letter queue is a queue that stores messages that cannot be processed successfully and thus require further work to be done—e.g., inspecting messages to debug the cause, restoring messages after the cause of failure has been fixed, etc. In various embodiments, a regular queue is a queue that is accessible to nodes 140 for enqueuing, dequeuing, and processing messages, while a dead-letter queue is a queue that is accessible to a different component, but not nodes 140 for dequeuing and processing. Dead-letter queues may be provisioned in a similar manner to regular queues—e.g., one dead-letter queue per tenant, one dead-letter queue per message type, one dead-letter queue per regular queue etc. In some embodiments, a processing thread 144 checks the processed count of a message and if the count is at or above a defined limit, then it moves the message to a dead-letter queue. (Note that several attempts may be made to process a message before moving it to a dead-letter queue.) In some embodiments, the processed count limit is different between messages based on type. In various embodiments, a processing thread 144 checks the processed count of a message at two, different points: 1) at the end of processing any failed message (so that it may determine whether to place the message in a dead-letter queue), and 2) at the beginning of processing a message (to avoid processing a message that has already been placed in a dead-letter queue, but not removed from a regular queue). For the second point, in particular, moving a message from a regular queue to dead-letter queue may involve two steps: 1) sending a duplicate of the message to the dead-letter queue, and 2) deleting the original message from the regular queue. There, however, may exist a small interval of time between these two steps where a duplicate message has been placed in a dead-letter queue, but the original message has not been deleted and thus a processing thread 144 may unknowingly attempt to process the original message. Thus, a processing thread 144 may check a message before processing it to determine whether it has been probably sent to a dead-letter queue, but has not been deleted yet.

In an example implementation of the illustrated embodiment, service 120 includes a queue 125A for storing messages of type A, a queue 125B for storing messages of type B, and a generic queue 125D. Also, as shown, queues 125A and 125B are associated with tenant 210A, and queue 125D is associated with tenant 210B. Thus, in the implementation of the illustrated embodiment, messages associated with applications 110A and 110B may be placed in either queue 125A, 125B, or a wildcard queue 125. For example, if application 110A wishes to send (via node 140) a message of type A to platform 130, then that message may be placed in queue 125A, but not in queue 125B. Moreover, in such an implementation, application 110C may be prevented from having its messages placed in queues 125A and 125B because they are associated with tenant 210A. Application 110C may be prevented from having its messages placed in those queues by message router 220 as the name constructed for a message originating from application 110C will not be indicative of tenant 210A and thus cannot point to a queue 125 associated with tenant 210A.

By provisioning queues 125 in this way, platform 130 may ensure that a tenant of message system 100 cannot easily prevent another tenant's messages from being processed in a timely manner as they do not share the same queues 125. But additional measures may be taken when assigning processing nodes 140 to these queues 125 to further ensure that a tenant cannot degrade the experience of another tenant. The ways in which nodes 140 may be assigned to queues 125 will now be discussed with respect to FIG. 3.

Figure 3:
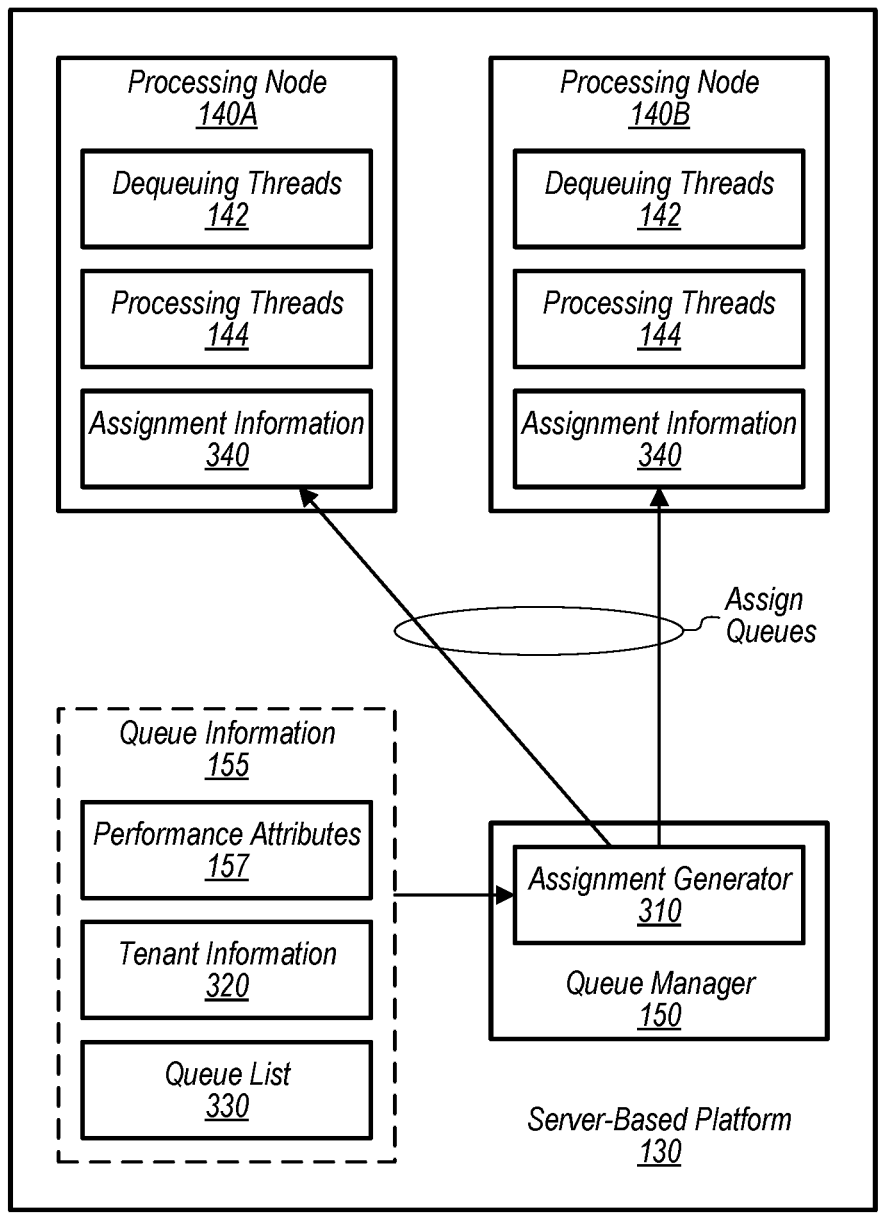
FIG. 3 is a block diagram illustrating example elements of a server-based platform that facilitates the processing of messages, according to some embodiments.

Turning now to FIG. 3, a block diagram of a server-based platform 130 is shown. In the illustrated embodiment, platform 130 includes processing nodes 140, queue manager 150, and queue information 155. Also, as shown, processing nodes 140 include dequeuing threads 142, processing threads 144, and assignment information 340. As further shown, manager 150 includes an assignment generator 310, and queue information 155 includes performance attributes 157, tenant information 320, and queue list 330. Platform 130 may, in some embodiments, be implemented differently than shown—e.g., information 155 may be located at service 120.

As explained above, processing nodes 140, in various embodiments, are capable of processing messages associated with applications 110. Processing nodes 140 may be assigned a set of queues 125 by manager 150 for which they spawn processing threads 144 to process messages from those queues. It may be desirable to assign nodes 140 in a certain manner that accounts for issues such as the starvation issues discussed earlier.

Accordingly, in some embodiments, manager 150 implements assignment generator 310 that gathers information about processing nodes 140 and queues 125 and then uses that information to assign nodes 140 to queues 125. In various embodiments, the information that is gathered by generator 310 includes performance attributes 157, tenant information 320, and queue list 330. Performance attributes 157 may indicate, for example, the number of messages expected or already enqueued in a queue 125, the time taken for a message to be processed after being enqueued (including the time taken to move to the top of the queue 125), the time that a thread spends processing a message (i.e. thread usage time), and the number of threads that are currently processing messages from a given queue 125. Tenant information 320 may indicate the tenant of platform 130 that is associated with each queue 125. Queue list 330 may indicate all queues 125 that are currently operating at service 120, including the names of those queues. In some embodiments, list 330 includes information 320 as the specified queue names in list 330 are indicative of the tenants of those queues 125. In some embodiments, queue information 155 may be split into different portions that are located at different locations—e.g., service 120 maintains queue list 330 while platform 130 maintains performance attributes 157 and tenant information 320.

After gathering queue information 155, in various embodiments, generator 310 then assigns queues 125 to nodes 140. In some embodiments, generator 310 determines, based on how long it takes for a thread 144 to process a message from a queue 125, the remaining time needed to process all messages currently stored in that queue. After determining the amount of time remaining (which is indicative of the remaining work), generator 310 may roughly divide the work between nodes 140. Consider an example in which there are seven processing nodes 140 and five queues 125 having differing amounts of work where queues 1 and 2 store a high volume of messages that take a while to process and queues 3, 4, and 5 store a low volume of messages that can be quickly processed. In this example, generator 310 may assign two nodes 140 to queue 1, two nodes 140 to queue 2, and one, different node 140 for each of queues 3, 4, and 5. In doing this, generator 310 may prevent a single node 140 from being overburdened by a queue 125. In some embodiments, generator 310 assigns queues 125 to nodes 140 based on the tenant associated with each queue 125. In particular, it may be desirable to have the same processing node 140 process messages from the same tenant as this may allow that node 140 to better utilize its cache—this being because messages from the same tenant have a higher chance of using the same data. Thus, generator 310 may assign queues 125 of the same tenant to the same node 140.

In assigning processing nodes 140 to queues 125, generator 310 may generate assignment information 340 that is provided to nodes 140. Assignment information 340, in various embodiments, specifies a mapping from a subset of the assigned queues 125 to the number of processing threads 144 that should be processing messages from queues 125 in that subset. The union of all queue subsets (i.e., the union of all keys of the map) may be indicative of the set of queues 125 that have been assigned to that node 140. (Note that two or more processing nodes 140 may overlap in part or entirely in the queues that they are assigned). In some cases, the map specified in information 340 may be a singleton map, indicating that all processing threads 144 of a node 140 are to process messages from all queues 125 that are assigned to that node. In some cases, a subset of processing threads 144 may be assigned to a particular group of queues 125 while another subset of threads 144 are assigned to a different group of queues 125. For example, if a processing node 140 has been assigned queues 125 that are associated with a tenant A and a tenant B, then some of a node 140's processing threads 144 may process from queues 125 of tenant A while other threads 144 of that node process from queues of tenant B. In some embodiments, assignment information 340 specifies a similar map for dequeuing threads 142 that defines a mapping from assigned queues 125 to threads 142.

Accordingly, generator 310 may control the number of processing threads 144 that are spawned by a node 140 and the role of those threads. In some embodiments, generator 310 limits the number of threads 144 concurrently processing a queue 125 based on quotas (e.g., keeping the total thread time spent on a single queue 125 under a particular threshold, preventing no more than a specified amount of all threads from processing message from the same queue at any given time, etc.). In some embodiments, generator 310 limits the number of threads serving troublesome queues 125 with service tiers. In particular, generator 310 may assign, for example, all threads 144 of a node 140 to process messages from queues 125 in a first tier, 40% of all threads 144 to process messages from queues 125 in a second tier, and 20% of all threads 144 to process messages from queues 125 in a third tier. In some embodiments, queues 125 move between the tiers based on their latencies and thread time usage. For example, if a particular queue 125 receives a spike in messages that take a while to process, then that queue 125 may be moved to a lower tier. In some embodiments, generator 310 limits the number of threads 144 that are processing messages for a given tenant of platform 130.

After receiving assignment information 340, in various embodiments, a processing node 140 spawns dequeuing threads 142 based on the mapping specified by information 340. In some cases, for each assigned queue 125, a node 140 may spawn a thread 142 that continually long polls from that queue. In some embodiments, when a message is received by a thread 142, that thread stores that message in a local pre-fetch buffer that is accessible to the one or more threads 144 that are responsible for processing that message. In some embodiments, that dequeuing thread 142 sends the message directly to a thread 144. In a similar manner, in various embodiments, a processing node 140 spawns processing threads 144 based on the mapping specified by information 340. The processing threads 144 may retrieve messages (in a round-robin fashion) from the pre-fetch buffers that are associated with the queues that they serve.

In some embodiments, generator 310 updates assignment information 340 for each node 140. Generator 310 may update information 340 based on various scenarios including in response to a new queue 125 being provisioned at service 120 (since such a queue 125 has not been assigned to any node 140), in response to information 155 being updated (e.g., the latency of particular queue 125 has increased), and/or periodically. A processing node 140, in various embodiments, determines the desired behavior from information 340 and thus may start/stop dequeuing threads 142 and processing threads 144 based on changes to information 340. For example, generator 310 may cause more threads 144 to be spawned by a node 140 in response to detecting that there are queues 125 with high latency.

By assigning queues 125 to nodes 140 in this manner, platform 130 may ensure that each tenant's messages are handled fairly. That is, in some cases, each tenant may receive their own queues 125 that assigned to nodes 140 in way that avoids starvation issues. An example of ways in which queues 125 can be removed will now be discussed with respect to FIG. 4.

Figure 4:
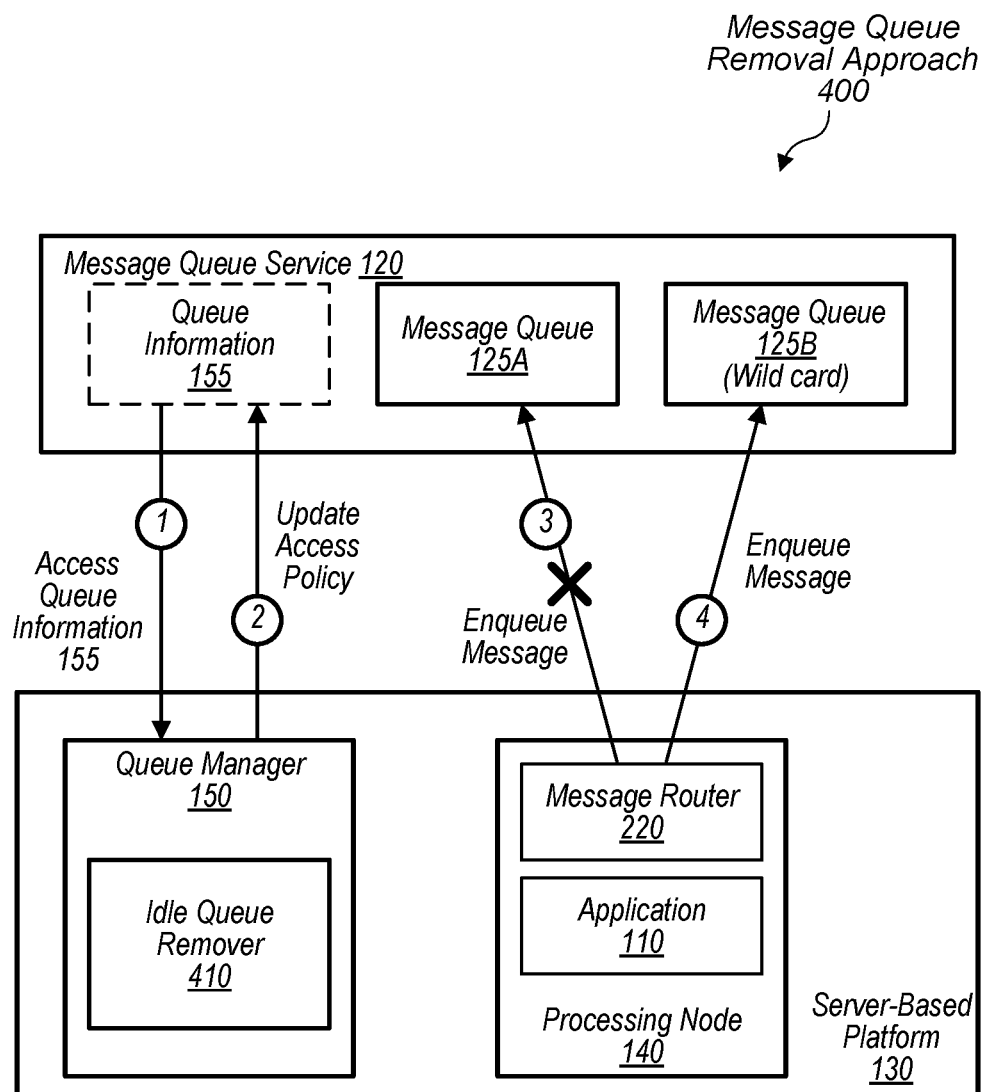
FIG. 4 is a block diagram illustrating example elements of a message queue removal approach, according to some embodiments.

Turning now to FIG. 4, a block diagram of an approach 400 to remove queues 125 from a message queue service 120 is shown. In the illustrated embodiment, approach 400 includes an application 110, a message queue service 120, and a server-based platform 130. Also as shown, platform 130 includes a queue manager 150 having an idle queue remover 410, and a processing node 140 that is running application 110 and message router 220. Additionally, as shown, service 120 includes queue information 155, a queue 125A, and a wild card queue 125B (i.e., a catch-all queue 125 that stores messages of all types). In some embodiments, approach 400 may be implemented differently than shown—e.g., service 120 may not include a wild card queue 125.

In various embodiments, manager 150 implements idle queue remover 410 in order to remove idle queues 125 provisioned at service 120. Remover 410 may periodically (e.g., every five minutes) gather metrics (in the form of queue information 155) about all queues 125 provisioned by platform 130. These metrics may include the number of messages that have been recently received from message router 220 on behalf of applications 110 or sent to dequeuing threads 142. If a queue 125 has been idle (e.g., no messages sent or received) for a period of time (e.g., one hour), in various embodiments, remover 410 updates the access policy associated with that queue to disallow messages to be stored there. Remover 410 may issue a request to service 120 to update the access policy; however, this request may take a certain amount of time (e.g., one minute) to propagate through service 120. Accordingly, during the period of time when the access policy is being updated, message router 220 may attempt to store a message in that queue 125. Thus, in some embodiments, when remover 410 executes again (e.g., a scheduled job that runs every five minutes), remover 410 determines whether any messages have been enqueued in that queue 125. If a message has been enqueued, then remover 410 may wait until that message is retrieved by a dequeuing thread 142. If a message has not been enqueued, then remover 410 may delete that queue 125 from service 120.

In some embodiments, the time interval that remover 410 waits between each execution is greater than the time that a change takes to propagate through service 120. Thus, after issuing the command to update the access policy, the next time that remover 410 executes, it may be (mostly) guaranteed that the change has propagated and thus message router 220 will not be storing messages in the queue 125. In some embodiments, if message router 220 attempts to enqueue a message after the changes to the access policy have propagated, then that attempt is rejected. In response to a rejection to a request to store a message in a particular queue (e.g., queue 125A), message router 220 may store that message in a wild card queue (e.g., queue 125B). By removing queues 125 in this manner, a provider of platform 130 may reduce the cost of maintaining queues 125 at service 120.

Figure 5:
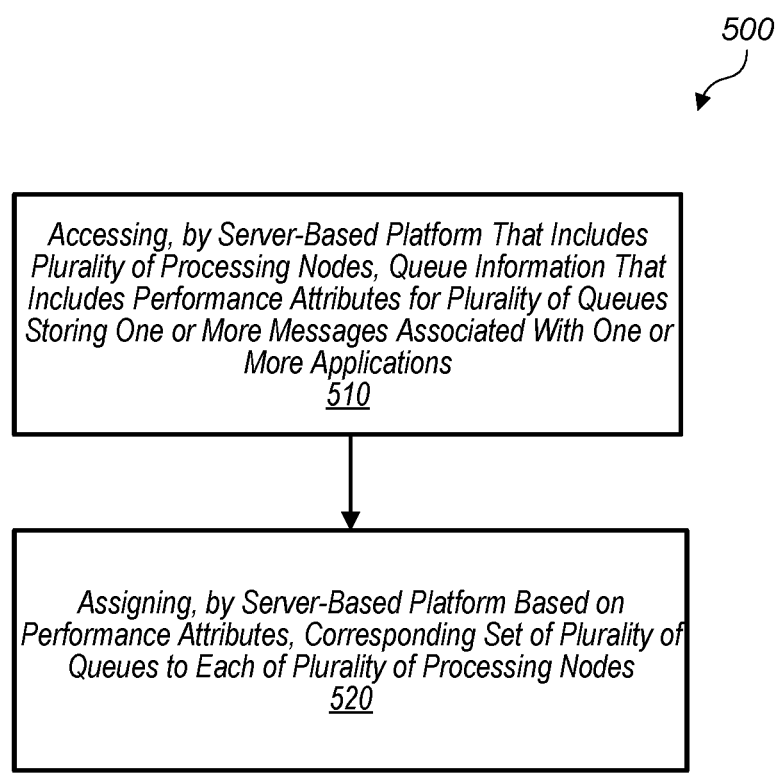
FIGS. 5-7 are flow diagrams illustrating example methods relating to the assignment of message queues to processing nodes, according to some embodiments.

Turning now to FIG. 5, a flow diagram of a method 500 is shown. Method 500 is one embodiment of method performed by a server-based platform (e.g., platform 130) to facilitate the processing of messages enqueued in message queues (e.g., queues 125). In some embodiments, method 500 is performed in response to provisioning a message queue at a message queue service (e.g., service 120). In some embodiments, method 500 includes additional steps—e.g., the server-based platform may remove an idle queue.

Method 500 begins in step 510 with a server-based platform (having a plurality of processing nodes (e.g., nodes 140)) accessing queue information (e.g., information 155) that includes performance attributes (e.g., attributes 157) for a plurality of queues storing one or more messages corresponding to (e.g., sent on behalf of) one or more applications (e.g., applications 110) associated with the server-based platform. The one or more messages may respectively specify a set of tasks to be performed by the server-based platform. In various embodiments, a given queue is associated with a message type that determines one or more particular tasks that are allowed to be enqueued in that given queue as one or more messages.

In some embodiments, the performance attributes specify a latency for messages enqueued in a given queue where the latency is indicative of a period of time taken to process a message after enqueueing the message in the given queue. In some embodiments, the queue information specifies, for a particular one of the plurality of queues, a user of the server-based platform that is 1) associated with that particular queue and 2) permitted to provide messages to that particular queue. In such embodiments, a different user of the server-based platform may be prevented from providing messages to that particular queue.

In step 520, the server-based platform assigns, based on the performance attributes, a corresponding set of the plurality of queues to each of the plurality of processing nodes. In various embodiments, this assigning causes instantiation of a first set of one or more dequeuing threads (e.g., threads 142) and a second set of one or more processing threads (e.g., threads 144). In various embodiments, the first set of one or more dequeuing threads are executable to dequeue one or more messages stored in the corresponding set of queues and store the dequeued one or more messages in an intermediate storage area. The instantiation of the first set of one or more dequeuing threads may be such that at least one dequeuing thread is instantiated per queue in the corresponding set of queues. In various embodiments, the second set of one or more processing threads are executable to retrieve the one or more messages from the intermediate storage area and perform one or more tasks specified in the retrieved one or more messages. In some embodiments, the assigning is such that two or more of the plurality of queues that are associated with the same user of the server-based platform are assigned to the same processing node.

In some embodiments, subsequent to the assigning of the sets of queues, the server-based platform determines that a particular one of the plurality of queues is associated with a latency that satisfies a predefined threshold. Accordingly, based on this determining, the server-based platform assigns a set of additional processing nodes for processing messages from the particular queue.

In an example implementation of method 500, a company A provides a sever-based platform (e.g., a multi-tenant cloud platform) to various tenants having applications that are designed to provide requests to the platform via messages. Company A may allocate, for a tenant A and a tenant B, respective message queues at a message queue service that are for receiving messages from the applications of tenant A and B. Accordingly, in step 510, the server-based platform accesses queue information (which may list the message queues that have already been provisioned at the message queue service) that includes performance attributes (e.g., the number of messages currently stored in a queue and the time taken to process one of those messages) for the allocated queues. In step 520 of this example, the platform assigns the message queues of tenant A to one processing node and the message queues of tenant B to another processing node based on the performance attributes. This assignment may be performed in a manner that assigns message queues of the same tenant to the same processing node and distributes the workload of these message queues. After the processing nodes have been assigned queues, they may instantiate dequeuing threads to retrieve messages from the assigned queues and processing threads to then process those messages.

Figure 6:
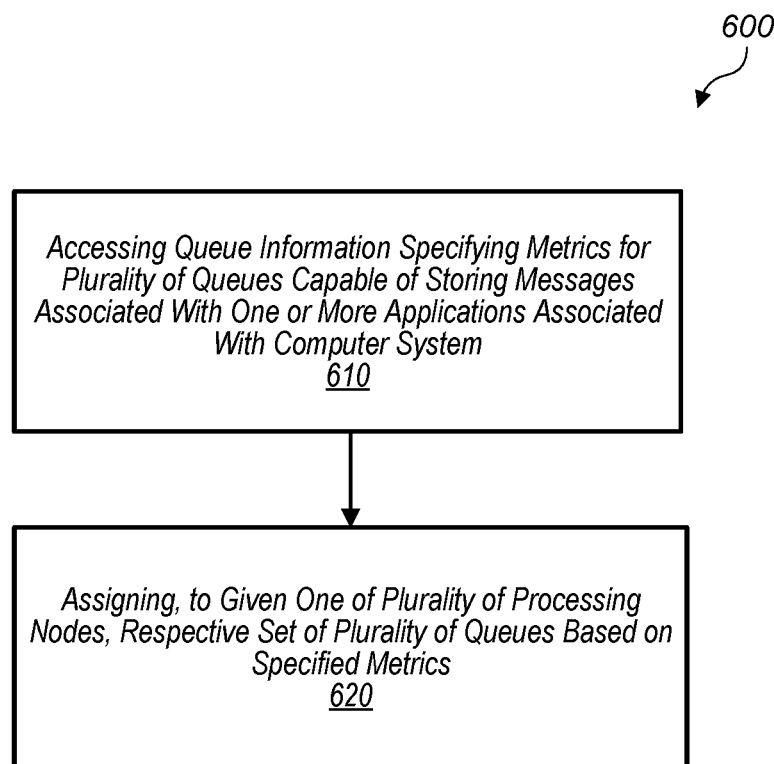

Turning now to FIG. 6, a flow diagram of a method 600 is shown. Method 600 is one embodiment of method performed by a computer system (e.g., server-based platform 130) to facilitate the processing of messages enqueued in message queues (e.g., queues 125). In some embodiments, method 600 includes additional steps—e.g., the server-based platform may remove an idle queue.

Method 600 begins in step 610 with a computer system accessing queue information (e.g., information 155) specifying metrics (e.g., atrributes 157) for a plurality of queues that are capable of storing messages corresponding to one or more applications (e.g., applications 110) associated with the computer system. A given message may specify a set of tasks to be performed by the computer system. In some embodiments, the computer system determines a division of a plurality of users of the computer system into two or more user groups, where a particular one of the plurality of queues stores messages corresponding to only one or more applications associated with users in a particular one of the two or more user groups.

In step 620, the computer system assigns, to a given one of a plurality of processing nodes (e.g., nodes 140), a respective set of the plurality of queues based on the specified metrics. The assigning may prevent a particular one of the plurality of queues from being serviced by more than a maximum number of nodes. In various embodiments, the assigning causes that given entity to instantiate a dequeuing thread (e.g., thread 142) for a given queue in the respective set and a set of processing threads (e.g., threads 144). In some embodiments, the dequeuing thread is executable to retrieve one or more messages stored in that given queue and store the one or more messages in a storage area. In some embodiments, the set of processing threads are executable to retrieve the one or more messages from the storage area and perform one or more tasks specified in the one or more message.

In some embodiments, the computer system provisions a wildcard queue that is capable of storing messages of a plurality of different message types from the one or more applications associated with the computer system. The computer system may determine that the wildcard queue is storing at least a threshold number of messages of a particular message type that have been received within a particular timeframe from one or more applications associated with a particular user. Accordingly, based on this determining, the computer system may provision a particular queue that is capable of storing messages of only that particular message type from one or more applications associated with the particular user. In some embodiments, subsequent to provisioning the particular queue, the computer system assigns at least one of the plurality of processing nodes to the particular queue to process messages stored in the particular queue.

In some embodiments, the computer system determines that a particular one of the plurality of queues has been idle for an interval of time that satisfies a threshold amount of time. In response to this determining, the computer system, in some embodiments, deletes the particular queue. Deleting the particular queue may involve the computer system updating an access policy of the particular queue to prevent messages from being stored in the particular queue. This updating of the access policy, however, may take a particular amount of time to propagate. Accordingly, subsequent to the particular amount of time elapsing, the computer system may determine whether one or more messages have been enqueued in the particular queue. In response to determining that no messages have been enqueued in the particular queue, the computer system may then delete the particular queue. In some embodiments, messages that are directed to the particular queue after the access policy has been updated are sent to a wildcard queue provisioned by the computer system.

Figure 7:
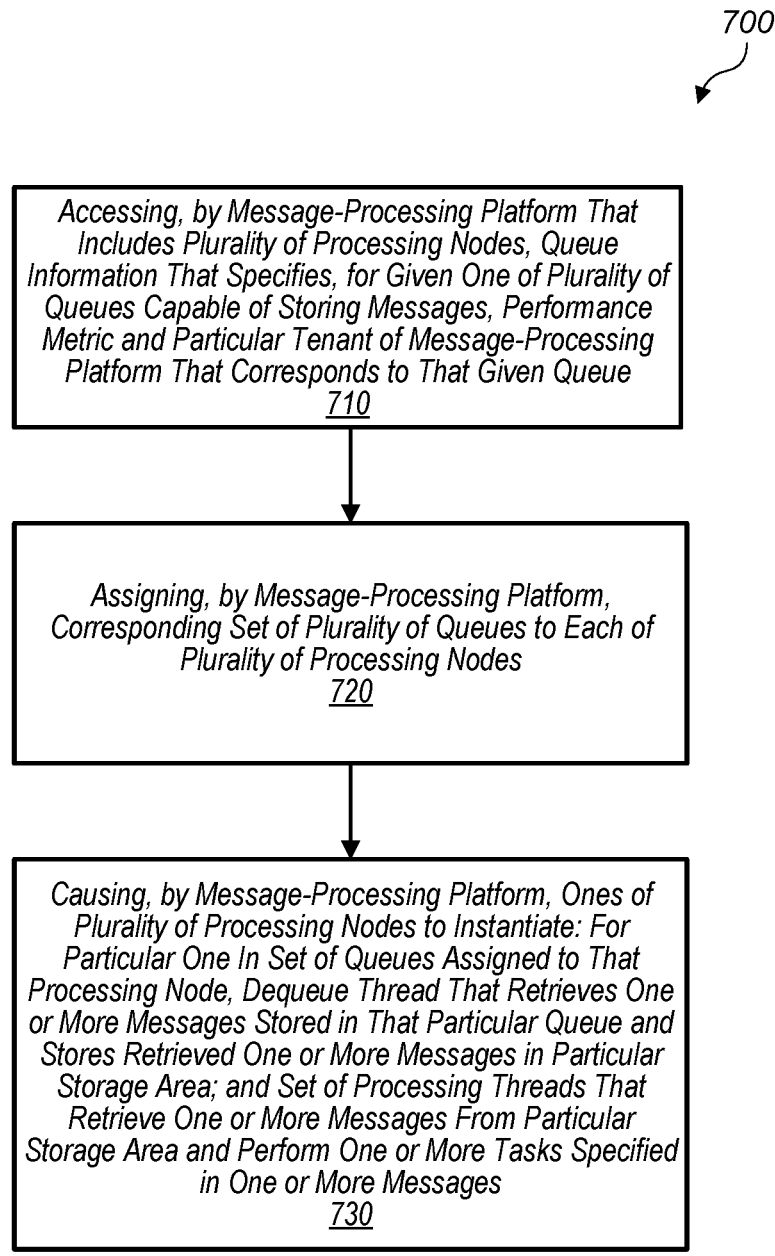

Turning now to FIG. 7, a flow diagram of a method 700 is shown. Method 700 is one embodiment of a method perform by a message-processing platform (e.g., server-based platform 130) to facilitate the handling of queues (e.g., queues 125). In some embodiments, method 700 includes additional steps—e.g., the server-based platform may remove an idle queue.

Method 700 begins in step 710 with a message-processing platform accessing queue information (e.g., information 155) that specifies, for a given one of a plurality of queues capable of storing messages, a performance metric (e.g., performance attributes 157) and a particular tenant of the message-processing platform that corresponds to that given queue. The messages may respectively specify a set of tasks to be performed by at least one of a plurality of processing nodes (e.g., nodes 140) of the message-processing platform.

In step 720, the message-processing platform assigns a corresponding set of the plurality of queues to each of the plurality of processing nodes. In some embodiments, this assigning may be based on the performance metric and is such that queues corresponding to the same particular tenant are assigned to the same processing node. In some embodiments, the message-processing platform provides, to a given one of the plurality of processing nodes, assignment information (e.g., information 340) that indicates a number of processing threads to be instantiated for the set of processing threads.

The assignment information may define a mapping from processing threads to assigned queues where a first subset of processing threads maps to a first subset of assigned queues, and a second, different subset of processing threads maps to a second, different subset of assigned queues. In some embodiments, the assignment information defines a maximum number of processing threads that can process messages from queues corresponding to a particular tenant. In some embodiments, the message-processing platform updates the assignment information provided to a particular processing node to increase the number of processing threads to be instantiated. In some embodiments, the message-processing platform updates the assignment information provided to a particular processing node to remove a queue assigned to that particular processing node.

In step 730, the message-processing platform causes ones of the plurality of processing nodes to instantiate: a dequeuing thread for a particular one in the set of queues assigned to that processing node, and a set of processing threads. The dequeuing thread may retrieve one or more messages stored in that particular queue and stores the retrieved one or more messages in a particular storage area. The processing threads may retrieve the one or more messages from the particular storage area and perform one or more tasks specified in the one or more messages.

Exemplary Multi-Tenant Database System

Figure 8:
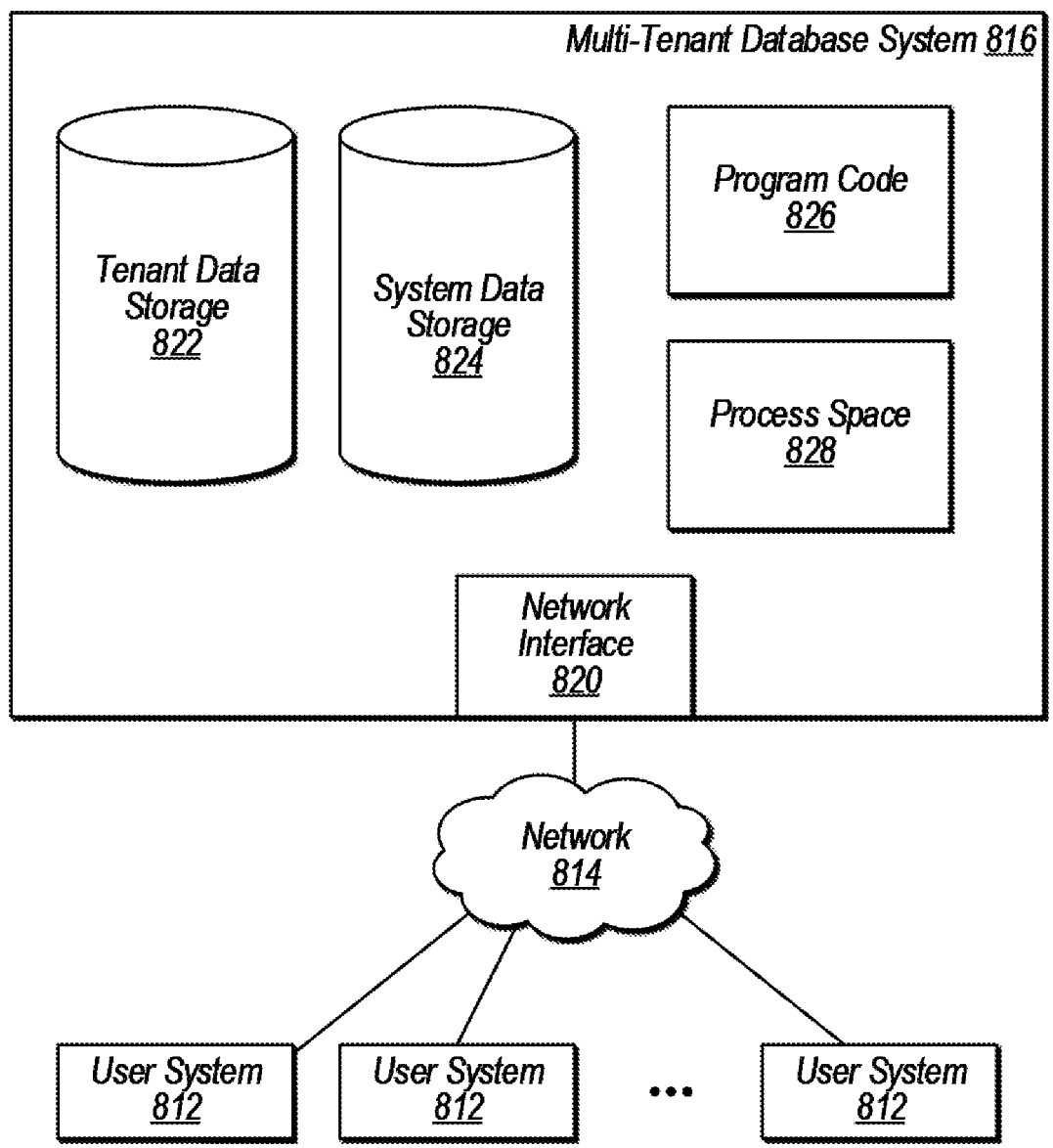
FIGS. 8-9 are example environments for a multi-tenant database system, according to some embodiments.

FIG. 8 illustrates an exemplary environment in which a multi-tenant database and cache system might be implemented. Note that the disclosed multi-tenant systems are included to illustrative purposes but are not intended to limit the scope of the present disclosure. In other embodiments, similar techniques may be implemented in non-multi-tenant environments such as various client/server environments, cloud computing environments, clustered computers, etc. As illustrated in FIG. 8 (and in more detail in FIG. 9) one or more user systems 812 may interact via a network 814 with a multi-tenant database system (MTS) 816, which may be server-based platform 130. The users of those user systems 812 may be users in differing capacities and the capacity of a particular user system 812 might be determined by the current user. For example, when a salesperson is using a particular user system 812 to interact with MTS 816, that user system 812 may have the capacities allotted to that salesperson. However, while an administrator is using the same user system 812 to interact with MTS 816, it has the capacities allotted to that administrator. Accordingly, in various embodiments, information (e.g., queue information 155) maintained by a system (e.g., server-based platform 130) implementing system 816 can be modified by only the users that have the appropriate capacities (e.g., permissions).

Network 814 may be a LAN (local area network), WAN (wide area network), wireless network, point-to-point network, star network, token ring network, hub network, or any other appropriate configuration. The global internetwork of networks often referred to as the "Internet" with a capital "I," will be used in many of the examples herein and is one example of a TCP/IP (Transfer Control Protocol and Internet Protocol) network. It should be understood, however, that the networks that the present invention may utilize any of various other types of networks.

User systems 812 may communicate with MTS 816 using TCP/IP and, at a higher network level, use other common Internet protocols to communicate, such as HTTP, FTP, AFS, WAP, etc. As an example, where HTTP is used, user system 812 might include an HTTP client commonly referred to as a "browser" for sending and receiving HTTP messages from an HTTP server at MTS 816. Such a server might be implemented as the sole network interface between MTS 816 and network 814, but other techniques might be used as well or instead. In some implementations, the interface between MTS 816 and network 814 includes load sharing functionality, such as round-robin HTTP request distributors to balance loads and distribute incoming HTTP requests evenly over a plurality of servers. Preferably, each of the plurality of servers has access to the MTS's data, at least for the users that are accessing a server.

In some embodiments, the system shown in FIG. 8 implements a web-based customer relationship management (CRM) system. For example, in some embodiments, MTS 816 includes application servers configured to implement and execute CRM software applications as well as provide related data, code, forms, web pages and other information to and from user systems 812 and to store to, and retrieve from, a database system related data, objects and web page content. In embodiments of a multi-tenant system, tenant data is preferably arranged so that data of one tenant is kept separate from that of other tenants so that that one tenant does not have access to another tenant's data, unless such data is expressly shared.

One arrangement for elements of MTS 816 is shown in FIG. 8, including a network interface 820, storage 822 for tenant data, storage 824 for system data accessible to MTS 816 and possibly multiple tenants, program code 826 for implementing various functions of MTS 816, and a process space 828 for executing MTS system processes and tenant-specific processes, such as running applications as part of an application service.

Several elements in the system shown in FIG. 8 may include conventional, well-known elements that need not be explained in detail here. For example, each user system 812 may be a desktop personal computer, workstation, laptop, PDA, cell phone, or any WAP-enabled device or any other computing device capable of interfacing directly or indirectly to the Internet or other network connection. User system 812 may execute an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a user (e.g., subscriber of a CRM system) of user system 812 to access, process, and view information and pages available to it from MTS 816 over network 814. Each user system 812 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 816 or other systems or servers. As discussed above, the present invention is suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

In some embodiments, each user system 812 and its components are operator configurable using applications, such as a browser, that include computer code executable on one or more processing elements. Similarly, in some embodiments, MTS 816 (and additional instances of MTSs, where more than one is present) and their components are operator configurable using application(s) that include computer code executable on one or more processing elements. Thus, various operations described herein may be performed by executing program instructions stored on a non-transitory computer-readable medium and executed by one or more processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VB Script.

According to one embodiment, each MTS 816 is configured to provide web pages, forms, applications, data, and/or media content to user systems 812 to support the access by user systems 812 as tenants of MTS 816. As such, in this embodiment, MTS 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, MTSs may include one or more logically and/or physically connected servers distributed locally or across one or more geographic locations. Additionally, the term "server" includes a computer system, including processing hardware and process space(s), and an associated storage system and database application as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

Figure 9:
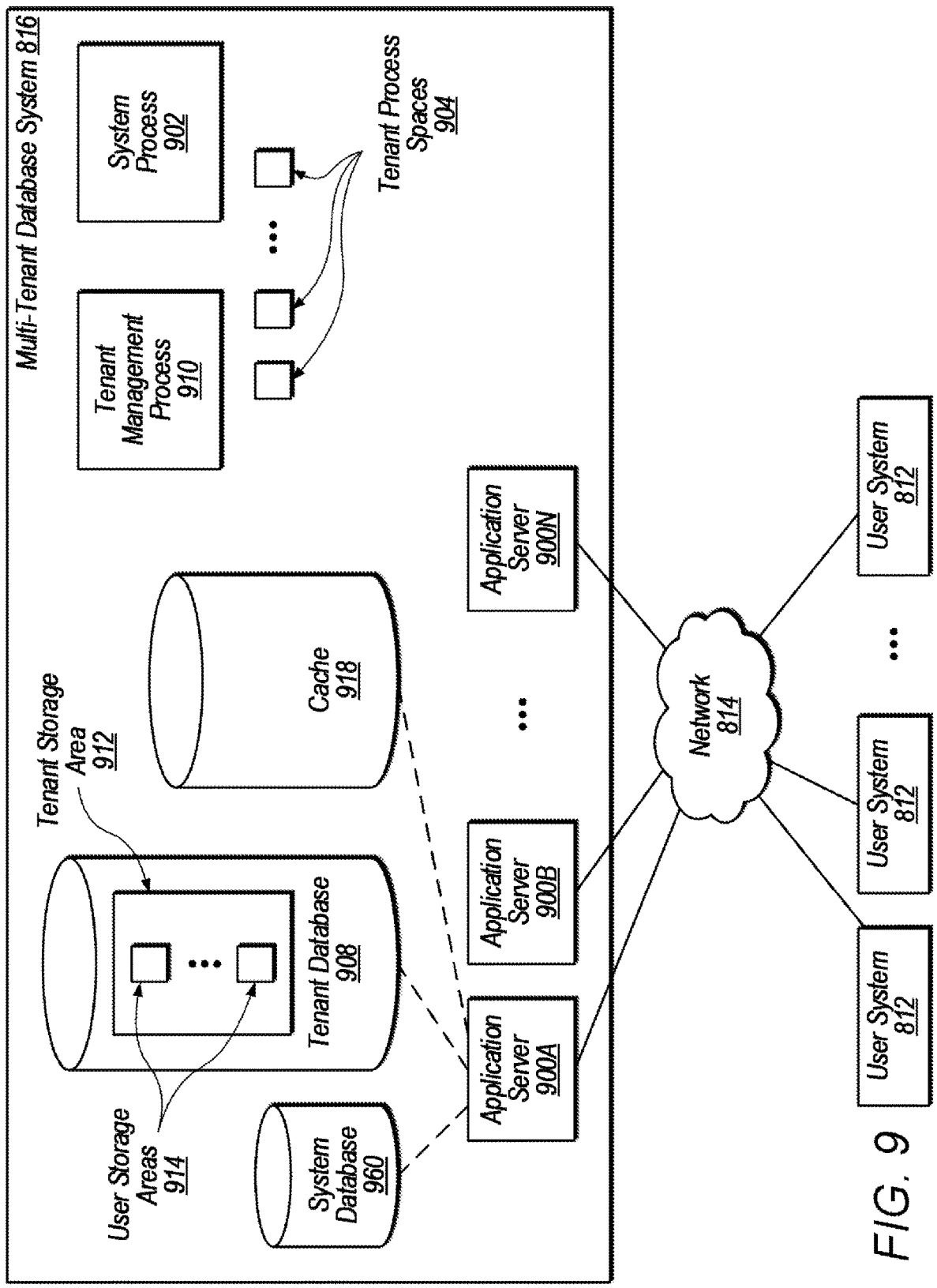

FIG. 9 illustrates exemplary embodiments of an MTS 816 and various interconnections in more detail. In this example, the network interface is implemented as one or more HTTP application servers 900. Also shown is system process space 902 including individual tenant process spaces 904, a system database 906, tenant database(s) 908 and a tenant management process space 910. Tenant database 908 may be shared across application servers 900 and may be divided into individual tenant storage areas 912, which can be either a physical arrangement or a logical arrangement. Within each tenant storage area 912, user storage 914 might be allocated for each user. While not shown, one or more applications 110 provided by tenants of MTS 816 may be running on application servers 900.

In the illustrated embodiment, each application server 900 also includes at least a portion of a cache 918. In some embodiments, user systems 812 that utilize web applications can request that data be stored in cache 918 (e.g., using a "put" operation) and later retrieve the data (e.g., using a "get" operation) rather than re-generating the data. In some embodiments, capacity limits may be assigned to different users/tenants/partitions, etc. and cached data may be evicted in order to remain below the allotted capacity. In some embodiments, cached data for a particular tenant is kept private from other tenants. Further, the visibility scope for cached data within a particular tenant may be configurable.

In some embodiments, cache 918 is split across multiple application servers 900. In some embodiments, splitting across multiple instances may allow the data in cache 918 to fit in system memory space, which may improve response times relative to storing data for cache 918 in disk storage, for example. As used herein, an "in-memory cache" is a cache that stores data in system memory space (which typically means that the data can be stored in RAM) rather than requiring paging for storage (as is typically required for traditional disc storage, for example). Cache 918 may also be a "multi-tenant" cache in the sense that a single cache is used to provide separate virtual caches for multiple different tenant entities. The different tenants may use the same data structure to store data or different tenants may have different data structures in the cache. In various embodiments, multi-tenant caches enforce data security between tenants such that data from one tenant is not available to other tenants. Thus, as used herein, the term "tenant" in the context of a multi-tenant cache refers to an entity for which cache entries are separately maintained such that different tenants cannot access each other's data. In some embodiments, tenants may authorize other tenants to access their data via the cache, while in other embodiments a given tenant's data may be accessible to only that tenant via the multi-tenant cache (although that tenant may subsequently share data retrieved from the cache, as that tenant desires).

It should also be understood that each application server 900 may be communicably coupled to database systems, e.g., system database 906 and tenant database(s) 908, via, a different network connection. For example, one server $900_1$ might be coupled via network 814, another server $900_{N-1}$ might be coupled via a direct network link, and another server $900_N$ might be coupled by yet a different network connection. Transfer Control Protocol and Internet Protocol (TCP/IP) are preferred protocols for communicating between servers 900 and the database system, however, it will be apparent to one skilled in the art that other transport protocols may be used to optimize the system depending on the network interconnect used.

In preferred aspects, each application server 900 is configured to handle requests for any user/organization. Because it is desirable to be able to add and remove application servers from the server pool at any time for any reason, there is preferably no server affinity for a user and/or organization to a specific application server 900. In one embodiment, therefore, an interface system (not shown) implementing a load balancing function (e.g., an F5 Big-IP load balancer) is communicably coupled between the servers 900 and the user systems 812 to distribute requests to the servers 900. In one aspect, the load balancer uses a least connections algorithm to route user requests to the servers 900. Other examples of load balancing algorithms, such as are round robin and observed response time, also can be used. For example, in certain aspects, three consecutive requests from the same user could hit three different servers, and three requests from different users could hit the same server. In this manner, MTS 816 is multi-tenant, wherein the MTS 816 handles storage of different objects and data across disparate users and organizations.

As an example of storage, one tenant might be a company that employs a sales force where each salesperson uses MTS 816 to manage their sales process. Thus, a user might maintain contact data, leads data customer follow-up data, performance data, goals and progress data, all applicable to that user's personal sales process (e.g., in tenant database 908). In some MTS embodiments, since all of this data and the applications to access, view, modify, report, transmit, calculate, eta, can be maintained and accessed by a user system having nothing more than network access, the user can manage his or her sales efforts and cycles from any of many different user systems. For example, if a salesperson is paying a visit to a customer and the customer has Internet access in their lobby, the salesperson can obtain critical updates as to that customer while waiting for the customer to arrive in the lobby.

While each user's sales data may be separate from other users' sales data regardless of the employers of each user, some data may be organization-wide data shared or accessible by a plurality or all of the sales three for a given organization that is a tenant. Thus, there may be some data structures managed by MTS 816 that are allocated at the tenant level while other data structures are managed at the user level. Because an MTS may support multiple tenants including possible competitors, the MTS should have security protocols that keep data, applications and application use separate. Also, because many tenants will opt for access to an MTS rather than maintain their own system, security, redundancy, up-time and backup are more critical functions and need to be implemented in the MTS.

In addition to user-specific data and tenant-specific data, MTS 816 might also maintain system level data usable by multiple tenants. Such system level data might include industry reports, news, postings, and the like that are sharable among tenants.

In certain aspects, client systems 812 communicate with application servers 900 to request and update system-level and tenant-level data from MTS 816 that may require one or more queries to database system 906 and/or database system 908. Accordingly, servers 900 may run applications 110 supplied by a provider of MTS 816 to process messages that specify these requests. In some embodiments, MTS 816 automatically generates one or more SQL statements (the SQL query) designed to access the desired information.

Each database may generally be viewed as a set of logical tables containing data fitted into predefined categories. Each table typically contains one or more data categories logically arranged in physical columns. Each row of a table typically contains an instance of data for each category defined by the columns. For example, a CRM database may include a table that describes a customer with columns for basic contact information such as name, address, phone number, fax number, etc. Another table may describe a purchase order, including columns for information such as customer, product, sale price, date, etc.

Figure 10:
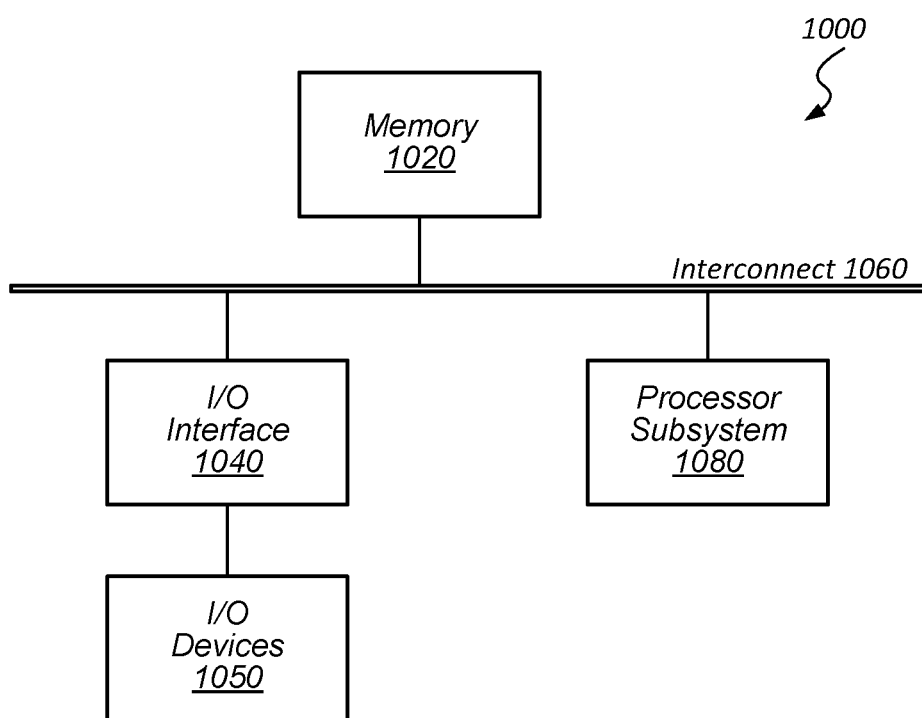
FIG. 10 is a block diagram illustrating an example computer system, according to some embodiments.

Turning now to FIG. 10, a block diagram of an exemplary computer system 1000, which may implement service 120 and/or server-based platform 130, is depicted. Computer system 1000 may be representative of service 120, platform 130, processing node 140, and/or manager 150. Computer system 1000 includes a processor subsystem 1080 that is coupled to a system memory 1020 and I/O interfaces(s) 1040 via an interconnect 1060 (e.g., a system bus). I/O interface(s) 1040 is coupled to one or more I/O devices 1050. Computer system 1000 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 1000 is shown in FIG. 10 for convenience, system 1000 may also be implemented as two or more computer systems operating together.

Processor subsystem 1080 may include one or more processors or processing units. In various embodiments of computer system 1000, multiple instances of processor subsystem 1080 may be coupled to interconnect 1060. In various embodiments, processor subsystem 1080 (or each processor unit within 1080) may contain a cache or other form of on-board memory.

System memory 1020 is usable store program instructions executable by processor subsystem 1080 to cause system 1000 perform various operations described herein. System memory 1020 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 1000 is not limited to primary storage such as memory 1020. Rather, computer system 1000 may also include other forms of storage such as cache memory in processor subsystem 1080 and secondary storage on I/O Devices 1050 (e.g., a hard drive, storage array, etc.). In some embodiments, these other forms of storage may also store program instructions executable by processor subsystem 1080. Applications 110 described above may be included within system memory 1020.

I/O interfaces 1040 may be any of various types of interfaces configured to couple to and communicate with other devices, according to various embodiments. In one embodiment, I/O interface 1040 is a bridge chip (e.g., Southbridge) from a front-side to one or more back-side buses. I/O interfaces 1040 may be coupled to one or more I/O devices 1050 via one or more corresponding buses or other interfaces. Examples of I/O devices 1050 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1000 is coupled to a network via a network interface device 1050 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   accessing, by a server-based platform that includes a plurality of processing nodes, queue information that includes performance attributes for a plurality of queues storing one or more messages corresponding to one or more applications associated with the server-based platform, wherein the one or more messages respectively specify a set of tasks to be performed by the server-based platform; and
   assigning, by the server-based platform based on the performance attributes, a corresponding set of the plurality of queues to each of the plurality of processing nodes, wherein assigning a corresponding set of queues to a given one of the plurality of processing nodes causes instantiation of:
      a first set of one or more dequeuing threads executable to dequeue one or more messages stored in the corresponding set of queues and store the dequeued one or more messages in an intermediate storage area; and
      a second set of one or more processing threads executable to retrieve the one or more messages from the intermediate storage area and perform one or more tasks specified in the retrieved one or more messages.

2. The method of claim 1, wherein the performance attributes specify a latency for messages enqueued in a given one of the plurality of queues, wherein the latency is indicative of a period of time taken to process a message after enqueueing that message in that given queue.

3. The method of claim 2, further comprising:
   subsequent to the assigning, the server-based platform determining that a particular one of the plurality of queues is associated with a latency that satisfies a predefined threshold; and
   based on the determining, the server-based platform assigning a set of additional processing nodes to process messages from the particular queue.

4. The method of claim 1, wherein the queue information specifies, for a particular one of the plurality of queues, a user of the server-based platform that is associated with that particular queue and permitted to provide messages to that particular queue, wherein a different user of the server-based platform is prevented from providing messages to that particular queue.

5. The method of claim 1, wherein the assigning is such that two or more of the plurality of queues that are associated with the same user of the server-based platform are assigned to the same processing node.

6. The method of claim 1, wherein the instantiation of the first set of one or more dequeuing threads is such that at least one dequeuing thread is instantiated per queue in the corresponding set of queues.

7. The method of claim 1, wherein a given one of the plurality of queues is associated with a message type that determines one or more particular tasks that are allowed to be enqueued in that given queue as one or more messages.

8. A non-transitory computer-readable medium having program instructions stored thereon that are executable by a computer system to perform operations comprising
   accessing queue information specifying metrics for a plurality of queues capable of storing messages corresponding to one or more applications associated with the computer system, wherein a given message specifies a set of tasks to be performed by the computer system; and
   assigning, to a given one of a plurality of processing nodes, a respective set of the plurality of queues based on the specified metrics, wherein assigning causes that given entity to instantiate:
      for a given one in the respective set of queues, a dequeuing thread that is executable to retrieve one or more messages stored in that given queue and store the one or more messages in a storage area; and
      a set of processing threads that are executable to retrieve the one or more messages from the storage area and perform one or more tasks specified in the one or more message.

9. The non-transitory computer-readable medium of claim 8, wherein the operations further comprise:
   provisioning a wildcard queue that is capable of storing messages of a plurality of different message types from the one or more applications associated with the computer system;
   determining that the wildcard queue is storing at least a threshold number of messages of a particular message type, wherein the messages of the particular message type are received within a particular timeframe from one or more applications associated with a particular user; and
   based on the determining, provisioning a particular queue capable of storing messages of only the particular message type from one or more applications associated with the particular user.

10. The non-transitory computer-readable medium of claim 9, wherein the operations further comprise:
    subsequent to provisioning the particular queue, assigning at least one of the plurality of processing nodes to the particular queue for processing messages stored in the particular queue.

11. The non-transitory computer-readable medium of claim 8, wherein the operations further comprise:
    determining that a particular one of the plurality of queues has been idle for an interval of time that satisfies a threshold amount of time; and in response to determining that the interval of time satisfies the threshold amount of time, deleting the particular queue by:
  updating an access policy of the particular queue to prevent messages from being stored in the particular queue, wherein updating the access policy takes a particular amount of time to propagate;
  subsequent to the particular amount of time elapsing, determining whether one or more messages have been enqueued in the particular queue; and
  in response to determining that no messages have been enqueued in the particular queue, deleting the particular queue.

12. The non-transitory computer-readable medium of claim 11, wherein the operations further comprise:
  provisioning a wildcard queue that is capable of storing messages of a plurality of different message types corresponding to one or more applications, wherein messages directed to the particular queue are sent to the wildcard queue after the updating of the access policy has propagated.

13. The non-transitory computer-readable medium of claim 8, wherein the operations further comprise:
  determining a division of a plurality of users of the computer system into two or more user groups, wherein a particular one of the plurality of queues stores messages corresponding to only one or more applications associated with users in a particular one of the two or more user groups.

14. The non-transitory computer-readable medium of claim 8, wherein the assigning includes:
  preventing a particular one of the plurality of queues from being serviced by more than a maximum number of nodes.

15. A method, comprising:
  accessing, by a message-processing platform that includes a plurality of processing nodes, queue information that specifies, for a given one of a plurality of queues capable of storing messages, a performance metric and a particular tenant of the message-processing platform that corresponds to that given queue, wherein the messages respectively specify a set of tasks to be performed by at least one of the plurality of processing nodes;
  assigning, by the message-processing platform, a corresponding set of the plurality of queues to each of the plurality of processing nodes, wherein the assigning is based on the performance metric and is such that queues corresponding to the same particular tenant are assigned to the same processing node;
  causing, by the message-processing platform, ones of the plurality of processing nodes to instantiate:
    for a particular one in the set of queues assigned to that processing node, a dequeuing thread that retrieves one or more messages stored in that particular queue and stores the retrieved one or more messages in a particular storage area; and
    a set of processing threads that retrieve the one or more messages from the particular storage area and perform one or more tasks specified in the one or more messages.

16. The method of claim 15, further comprising:
  providing, by the message-processing platform to a given one of the plurality of processing nodes, assignment information that indicates a number of processing threads to be instantiated for the set of processing threads.

17. The method of claim 16, wherein the assignment information defines a mapping from processing threads to assigned queues, wherein a first subset of processing threads maps to a first subset of assigned queues, and a second, different subset of processing threads maps to a second, different subset of assigned queues.

18. The method of claim 16, wherein the assignment information defines a maximum number of processing threads that can process messages from queues corresponding to a particular tenant.

19. The method of claim 16, further comprising:
  updating, by the message-processing platform, the assignment information provided to a particular processing node to increase the number of processing threads to be instantiated.

20. The method of claim 16, further comprising:
  updating, by the message-processing platform, the assignment information provided to a particular processing node to remove a queue assigned to that particular processing node.

* * * * *